United States Patent [19]

Barker et al.

[11] Patent Number: 5,112,877
[45] Date of Patent: May 12, 1992

[54] POLYISOCYANATE COMPOSITION

[75] Inventors: Martin C. Barker, Bertem; James P. Brown, Sterrebeek; Anthony Cunningham, Bertem; David Randall, Erps-Kwerps, all of Belgium

[73] Assignee: Imperial Chemical Industries PLC, London, England

[21] Appl. No.: 409,703

[22] Filed: Sep. 20, 1989

[30] Foreign Application Priority Data

Sep. 28, 1988 [GB] United Kingdom ............... 8822790

[51] Int. Cl.$^5$ ............... B01J 13/00; C08G 18/14; C08K 3/34; A61K 31/14
[52] U.S. Cl. .................... 521/110; 521/100; 521/111; 521/112; 521/114; 524/445; 424/46
[58] Field of Search ........... 521/111, 107, 128, 122, 521/124, 125, 110, 112, 114; 524/709, 714, 130, 729, 445; 523/568

[56] References Cited

U.S. PATENT DOCUMENTS

| | | | |
|---|---|---|---|
| 4,412,018 | 10/1983 | Finlayson et al. | 523/568 |
| 4,476,251 | 10/1984 | Cianciolo et al. | 521/110 |
| 4,558,075 | 12/1985 | Suss | 523/216 |
| 4,713,399 | 12/1987 | Webb et al. | 521/110 |

FOREIGN PATENT DOCUMENTS 228234 7/1987 European Pat. Off. .
2075038 11/1981 United Kingdom .
2104062 3/1983 United Kingdom .

*Primary Examiner*—John Kight, III
*Attorney, Agent, or Firm*—Cushman, Darby & Cushman

[57] ABSTRACT

Polyisocyanate composition comprising an organo clay and a cyclic alkylene carbonate. The composition is useful for wood-binding, preparing polyurethanes and rigid and flexible polyurethane foams.

6 Claims, No Drawings

POLYISOCYANATE COMPOSITION

The present invention is concerned with novel polyisocyanate compositions. Polyisocyanates have been known for a long time. They may, inter alia, be used for the preparation of polyurethanes and as binder for strawboard, fibreboard, chipboard, plywood and the like.

Although polyisocyanates have been used successfully as e.g. chipboard binders in the past, there remained room for improvement. The efficiency of the binding process appeared to be negatively influenced by absorption of polyisocyanates by the wood-particles. Consequently the amount of polyisocyanates needed to bind a certain amount of wood-chips is relatively high. There remains room for improvement in this respect.

Surprisingly, it has been found that this efficiency can be greatly improved by employing a polyisocyanate composition which, in addition to the polyisocyanate, comprises an organo clay and a polar activator. Such a polyisocyanate composition provides excellent adhesion to the wood-particles, exhibits an advantageous regel-time and can easily be sprayed.

Further, it has been found that such compositions advantageously may be used for the preparation of polyurethanes for coating purposes and the like. Without touching upon their processability such coatings appeared to exhibit improved sag characteristics. Still further, it has been found that the compositions according to the present invention may serve as ingredients for preparing flexible polyurethane foams and rigid polyurethane and polyisocyanurate foams. Flexible foams made from this composition showed improved cell-opening and crushability while rigid foams exhibited lower density.

Consequently, the present invention is concerned with a composition comprising a polyisocyanate, an organo clay and a cyclic alkylene carbonate. The cyclic alkylene carbonate acts as a polar activator and is a cyclic alkylene ester of carbonic acid. These carbonates are referred to hereinafter as "polar activator".

Organo clays as such are known. Organo clays are organophilic cation-modified clays derived from a clay mineral by replacing the inorganic exchangeable cations in the clay mineral by organic cations comprising at least one hydrocarbon radical which has sufficient carbon atoms to render the surface of the cation-exchanged clay hydrophobic.

Preferably organophilic cation-modified clays are employed, derived from a clay mineral selected from the group consisting of montmorillonite, bentonite, beidellite, hectorite, saponite and stevensite. The organic cations may be those derived from tertiary phosphonium salts and quaternary ammonium salts comprising at least one hydrocarbon radical which has sufficient carbon atoms to render the surface of the cation-exchanged clay hydrophobic. Preferably the organic cations are represented by the general formula

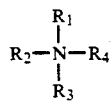

wherein $R_1$ is a saturated or unsaturated alkyl group having from 10-24 carbon atoms and $R_2$, $R_3$ and $R_4$, which are the same or different, are a saturated or unsaturated alkyl group having from 1-24 carbon atoms or an aralkyl group having from 7-10 carbon atoms. Examples of such cations are those derived from benzyl methyl dialkyl ammonium chlorides, dimethyl dialkyl ammonium chlorides, benzyl dimethyl alkyl ammonium chlorides and benzyl trialkyl ammonium chlorides.

Processes for making organo clay from clay minerals and quaternary ammonium salts are known.

Cyclic alkylene carbonates are known as well. The alkylene chain of the polar activator used in the composition according to the present invention may have 3-10 and preferably 3-6 carbon atoms. Preferred compounds are butylene carbonate and propylene carbonate. Most preference is given to propylene carbonate.

The polyisocyanate in the composition according to the present invention may be any—preferably organic—polyisocyanate compound or mixture of polyisocyanate compounds, provided said compounds have at least 2 isocyanate groups. Organic polyisocyanates include di-isocyanates, particularly aromatic di-isocyanates and isocyanates of higher functionality.

Examples of organic polyisocyanates which may be used in the process of the invention include aliphatic isocyanates such as hexamethylene diisocyanate, aromatic isocyanates such as meta- and para-phenylene diisocyanate, tolylene-2,4- and 2,6-diisocyanates, diphenylmethane-4,4'-diisocyanate, chlorophenylene-2,4-diisocyanate, naphtylene-1,5-diisocyanate, diphenylene-4,4,-diisocyanate, 4,4'-diisocyanate-3,3'-dimethyldiphenyl, 3-methyldiphenylmethane-4,4'-diisocyanate and diphenyl ether diisocyanate, cycloaliphatic diisocyanates such as cyclohexane -2,4-and 2,3-diisocyanates, 1-methyl cyclohexyl-2,4- and 2,6-diisocyanates and mixtures thereof and bis- (isocyanatocyclohexyl-)methane and tri- isocyanates such as 2,4,6-triisocyanatotoluene and 2,4,4-triisocyanatodiphenylether. Modified polyisocyanates, like those containing isocyanurate-, carbodiimide-, uretonimine-, urea-, biuret-, allophanate- or uretidinedione groups may be employed as well. Further blocked polyisocyanates, like the reaction product of a phenol or an oxime and a polyisocyanate, having a deblocking temperature below the temperature applied using the composition according to the present invention, may be used.

Mixtures of isocyanates may be used, for example a mixture of tolylene diisocyanate isomers such as the commercially available mixtures of 2,4- and 2,6-isomers and also the mixture of di- and higher poly-isocyanates produced by phosgenation of aniline/formaldehyde condensates. Such mixtures are well-known in the art and include the crude phosgenation products containing mixtures of methylene bridged polyphenyl polyisocyanates, including diisocyanate, triisocyanate and higher poly-isocyanates together with any phosgenation by-products.

Preferred isocyanates to be used in the present invention are those wherein the isocyanate is an aromatic diisocyanate or polyisocyanate of higher functionality such as a pure diphenylmethane diisocyanate or crude mixtures of methylene bridged polyphenyl polyisocyanates containing diisocyanates, triisocyanate and higher functionality polyisocyanates. Methylene bridged polyphenyl polyisocyanates are well known in the art and have the generic formula:

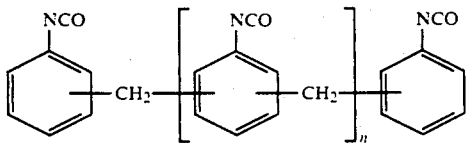

where n is 0 or more and in the case of the crude mixtures represents an average of more than one. They are prepared by phosgenation of corresponding mixtures of polyamines obtained by condensation of aniline and formaldehyde. For convenience, crude mixtures of methylene bridged polyphenyl polyisocyanates containing diisocyanate, triisocyanate and higher functionality polyisocyanates are referred to hereinafter as MDI.

Other organic isocyanates which can be used in the invention include isocyanate-ended prepolymers made by reaction of an excess of a diisocyanate or higher functionality polyisocyanate with a hydroxyl-ended polyester or hydroxyl-ended polyether and products obtained by reacting an excess of diisocyanate or higher functionality polyisocyanate with monomeric polyol or mixture of monomeric polyols such as ethylene glycol, trimethylol propane or butane-diol and isocyanate-ended prepolymers prepared using hydrophobic polyols such as castor oil.

The most preferred polyisocyanates are polymethylene polyphenylene polyisocyanates and isocyanate-ended prepolymers thereof. Preferably, the polyisocyanate is liquid at room temperature.

The relative amount of the polyisocyanate, the organo clay and the polar activator may vary between wide ranges. In general the amounts will range from 60-99.98, preferably from 80-99.9 and more preferably from 88-99.85% weight of polyisocyanate, 0.01-20, preferably from 0.05-10 and more preferably from 0.1-8% weight of organo clay and 0.01-20, preferably from 0.05-10 and more preferably from 0.05-4% weight of polar activator, calculated from the total amount of polyisocyanate, polar activator and organo clay in the composition.

The composition according to the present invention may comprise, preferably less than 25% weight (calculated from the total amount of polyisocyanate, polar activator and organo clay in the composition), of an inert, low boiling liquid. The presence of such a liquid may have advantages as will be explained hereinafter.

The inert, low boiling liquid may be any such liquid known in the art. Low boiling in this context means having a boiling point at atmospheric pressure of below 85° C. and preferably of 20°-80° C. Preference is given to lower halogenated alkanes such as methylene chloride, thrichloro-fluoromethane, $CHCl_3$ and $CCl_4$. Most preferably an inert, low-boiling liquid is used which is non-toxic and inflammable, like $Cl_3FC$.

The compositions according to the present invention further may comprise conventional additives like an inert diluent and/or solvent, lignocellulosic preserving agents, fire retardants, mould release agents like oil, wax polishes, silicones and polytetrafluoro-ethylene, wax release agents like those described in U.S. Pat. Nos. 4,388,138 and 4,431,455 and other binders like formaldehyde condensate adhesive resin for wood-binding purposes and like blowing agents, catalysts, surface active agents, flame retardants, cell stabilizers, fillers, chain-extenders, cross-linking agents, degellants, curing agents and fibrous reinforcements for preparing flexible and rigid polyurethane foams and rigid polyisocyanurate foams and like anti-foaming agents, thickening agents, tackifiers, fungicides, fillers, surfactants, other coating agents and/or organic solvents for coating purposes.

The composition according to the invention is prepared by combining and mixing the polyisocyanate, the organo clay and the polar activator. Such combination may be conducted in any order provided each combination step is followed by mixing and preferably by thorough mixing. More preferably at least one of the mixing steps following the combination of the polar activator and the organo clay is a high shear mixing step.

Preferably the composition according to the invention is prepared by combining and mixing the polyisocyanate, the organo clay, the polar activator and an inert, low-boiling liquid and subsequently removing at least part of the inert, low-boiling liquid. This combination may, likewise, be conducted in any order. Preferably, the organo clay and the polar activator are blended first; then this blend is combined and mixed with the inert, low-boiling liquid; subsequently this mixture is combined and mixed with the polyisocyanate.

The relative amounts of the polyisocyanate, the polar activator and the organo clay may be essentially the same as those wanted in the final composition. If the final composition should comprise a very high amount of polyisocyanate (e.g. above 98% weight) it is preferred to combine and mix a lower relative amount of polyisocyanate with the organo clay, the polar activator and the inert low-boiling liquid and, after these combination and mixing steps, to add extra polyisocyanate in order to arrive at the finally wanted composition. This procedure improves the efficiency of the mixing process. Extra polyisocyanate may be added before or after the inert, low-boiling liquid is removed. Removed inert, low-boiling liquid may be used again for preparing the next amount of the composition according to the present invention.

The relative amounts which are to be combined are—preferably—as follows: polyisocyanates: 60-98% weight, preferably 80-98% weight and more preferably 88-97% weight; polar activator: 1-20% weight, preferably 1-10% weight and more preferably 1-4% weight; and organo clay: 1-20% weight, preferably 1-10% weight and more preferably 2-8% weight. The amount of inert, low-boiling liquid combined and mixed with the other ingredients may vary from 25-200% weight. All these relative amounts are calculated from the total amount of polyisocyanate, polar activator and organo clay in the combination.

The combination of the ingredients is preferably conducted at ambient temperature and pressure. Due to the mixing process the temperature of the mixture may rise to more elevated levels. Measures should be taken in order to avoid unwanted removal of the inert, low-boiling liquid due to such temperature rise. This can be achieved easily, e.g. by cooling or by mixing in a closed, possibly pressurised, vessel. Of course, the same measures could be taken if an inert, low-boiling liquid is used which boils below ambient temperature.

Whether or not inert, low-boiling liquid is removed depends on the utility of the composition according to the present invention.

If it is to be used for wood-binding or coating purposes, preferably all inert, low-boiling liquid is to be removed, although up to 10% weight and preferably not more than 1% weight may be left in the composition. If the composition is to be used for preparing foams the inert, low-boiling liquid, especially if it is a blowing agent for making foams, may be left in the composition up to an amount of 25% weight (the amount of inert, low-boiling liquid being calculated from the amount of polyisocyanate, organo clay and polar activator).

The inert, low-boiling liquid is removed by methods known per se. Preferably the low-boiling liquid is removed by raising the temperature of the combination above the boiling point of the low-boiling liquid. The relative amount of inert, low-boiling liquid may also be lowered by adding extra polyisocyanate.

If desired, usual additives may be added during or after the process for the preparation of the composition according to the present invention.

The compositions, prepared as hereinbefore described, will preferably comprise 60–98% weight of polyisocyanate calculated from the total amount of polyisocyanate, polar activator and organo clay. Such compositions may be used directly as binders of straw, woodchips, plywood and the like.

For making polyurethanes, polyurethane rigid and flexible foams and polyisocyanurate foams the amount of polyisocyanate in the composition according to the invention is preferably higher.

This can be achieved simply by adding extra polyisocyanate to the composition comprising 60–98% weight of polyisocyanate so as to obtain a composition which comprises up to 99,98% weight of polyisocyanate and down to 0.01% weight of polar activator and organo clay.

The compositions according to the present invention may be used as binders of lignocellulosic material. Hence, the present invention is further concerned with lignocellulosic bodies comprising lignocellulosic parts bound together by means of a composition according to the present invention and with a process for preparing these bodies by bringing said parts into contact with said composition and by pressing this combination. The parts are brought into contact with the polyisocyanate composition in a conventional way such as by mixing, spraying and/or spreading. Subsequently, the material is, preferably hot-pressed, normally at 150°–220° C. and 20–70 kg/cm$^2$. The lignocellulosic parts used may be wood chips, wood fibres, shavings, veneers, cork, bark, sawdust and like waste products of the woodworking industry as well as other material having a lignocellulosic basis such as bagasse, straw, flax, sisal, hemp, rushes, reeds, husks and grasses. Additionally there may be mixed with the lignocellulosic parts, other particulates of fibrous materials such as glass fibre, mica, asbestos, rubber and plastics. The polyisocyanate composition according to the present invention may be applied as such, together with an inert hydrocarbon diluent or solvent or as an aqueous emulsion. Such emulsions may be made by stirring the polyisocyanate composition with water, if desired in the presence of an emulsifying agent. Preferably, the polyisocyanate composition is applied without the presence of a diluent, a solvent or water; such a composition may be easily sprayed.

The lignocellulosic bodies made by means of the polyisocyanate composition according to the present invention may be strawboard, chipboard, plywood, fibreboard and other bodies known in the art made from the aforementioned lignocellulosic parts.

The composition according to the present invention further may be used as an ingredient for preparing aqueous emulsions useful as coating compositions, like those described in U.S. Pat. No. 3,996,154 and UK patent application 8722973. Such emulsions may be used as a coating ingredient on a wide variety of substrates such as wood, metal and polyurethane foam.

The emulsions may be made by mixing the composition, according to the present invention with water, if desired in the presence of an emulsifying agent. The emulsion further may, advantageously, comprise vinyl polymers and especially isocyanate-reactive vinyl polymers, like those described in UK patent application 8722973.

Further the composition according to the present invention may be used for preparing flexible and rigid polyurethane foams and rigid polyisocyanurate foams. Hence, the present invention is still further concerned with polyurethane and polyisocyanurate foams prepared from an isocyanate-reactive hydrogen containing compound and a composition according to the present invention optionally in the presence of conventional auxiliary additives and with a process for preparing these foams by reacting the compound and the composition under foam-forming conditions, optionally in the presence of conventional auxiliary additives. As known, polyurethanes may be prepared by reacting polyisocyanates and isocyanate-reactive hydrogen containing compounds, in the presence of a catalyst and a blowing agent. Likewise polyisocyanurate foams are made by reacting polyisocyanates and isocyanate-reactive hydrogen containing compounds in the presence of a trimerization catalyst and a blowing agent.

In accordance with a certain trend in the art, the expression "polyurethane" as used herein is intended to refer to products obtained by reacting polyisocyanates with isocyanate-reactive hydrogen containing compounds and optionally with water, and the expression "isocyanate-reactive hydrogen containing compounds" as used herein is intended to include polyols as well as polyamines.

The expression "polyurethane" is thus intended also to include products which comprise urethane linkages (resulting from the reaction of isocyanate groups with hydroxyl groups of polyols) together with urea linkages (resulting from the reaction of isocyanate groups with amine groups of polyamines or with water), and even products which essentially comprise urea linkages with few or no urethane linkages.

Isocyanate-reactive hydrogen containing compounds for preparing flexible polyurethane foams are generally selected from polyols and polyamines with a functionality of 2–4 and an average equivalent weight ranging from 300–2500, preferably from 500 to 2000. Isocyanate-reactive hydrogen containing compounds for preparing rigid polyurethane and polyisocyanurate foams are preferably selected from polyols and polyamines with a functionality of at least 2.0 and a molecular weight from 60–1500.

Suitable polyols which can be employed include polyether and polyester polyols, polythioethers, polyacetals, polycarbonates and polyesteramides.

Suitable polyether polyols include those which are prepared by reacting one or more alkylene oxides or substituted alkylene oxides with one or more active hydrogen containing initiator compounds. Suitably such oxides include for example ethylene oxide, propylene oxide, butylene oxide, epichlorhydrin and epibromhydrin.

Suitable initiator compounds include, for example, water ethylene glycol, propylene glycol, butane diol, hexane diol, glycerol, trimethylol propane, pentaerythritol, hexanetriol, triethanolamine, sorbitol, sucrose, hydroquinone, resorcinol, catechol, bisphenols, novolac resins, phosphoric acid. These initiators may be used as polyols as well.

Further suitable initiators include, for example, ammonia, ethylenediamine, diaminopropanes, diaminobutanes, diaminopentanes, diaminohexanes, ethanolamine, aminoethylethanolamine, aniline, 2,4-toluenediamine, 2,6-toluenediamine, 2,4'-diamino-diphenylmethane, 4,4'-diaminodiphenylmethane, 1,3-phenylenediamine, 1,4-phenylenediamine, naphthylene-1,5-diamine, 4,4'-di(methylamino)-diphenylmethane, 1-methyl-2-methylamino-4-aminobenzene, 1,3-diethyl-2,4-diaminobenzene, 2,4-diaminomesitylene, 1-methyl-3,5-diethyl-2,4-diaminobenzene, 1-methyl-3,5-diethyl-2,6-diaminobenzene, 1,3,5-triethyl-2,6-diaminobenzene, and 3,5,3',5'-tetraethyl-4,4'-diaminodiphenylmethane.

Suitable polyester polyols which can be employed include, for example, those prepared by reacting one or more polycarboxylic acids or anhydrides or esters thereof with one or more polyhydric alcohols. The polycarboxylic acids may be aliphatic, cycloaliphatic, aromatic and/or heterocyclic and may be substituted (e.g. with halogen) and/or unsaturated. Examples of carboxylic acids of this kind include glutaric acid, succinic acid, adipic acid, suberic acid, azelaic acid, sebacic acid, phthalic acid, isophthalic acid, trimellitic acid, tetrahydrophthalic acid, hexahydrophthalic acid, tetrachlorophthalic acid, maleic acid, fumaric acid, dimeric and trimeric fatty acids, which may be in admixture with monomeric fatty acids, terephthalic acid, and the like.

Examples of suitable polyhydric alcohols include ethylene glycol; 1,2-propylene glycol; 1,3-propylene glycol; butylene glycols; 1,6-hexane diol; 1,8-octane diol; neopentyl glycol; 2-methyl-1,3-propane diol; glycerol; trimethylol propane; 1,2,6-hexane triol; 1,2,4-butane triol; trimethylol ethane; pentaerythritol; diethylene glycol; triethylene glycol; polyethylene glycols; dipropylene glycol; tripropylene glycol; polypropylene glycols; dibutylene glycol; or polybutylene glycols. It is also possible to use polyesters of lactones such as caprolactone.

Suitable polyether polyamines which can be employed include those which are prepared by amination of polyether polyols of the type described above. For use in accordance with the invention it is not necessary that the amination of the polyols be complete. Partially aminated polyether polyols of the type disclosed above can also be employed.

Other suitable polyol compositions which can be used include for example polyhydroxyl derivatives which contain high molecular polyaddition or polycondensation polymers in dispersed or soluble state. Such polyhydroxyl derivatives can for example be obtained by carrying out a polyaddition reaction (for instance between polyisocyanates and amino-functional compounds) or a polycondensation reaction (for instance between formaldehyde and phenols and/or amines) in situ in such polyols. Suitable are also polyhydroxyl derivatives modified by vinyl-polymerization, such as for example obtained by polymerizing styrene and acrylonitrile in the presence of polyether polyols or polycarbonate polyols.

Mixtures of polyols and/or polyamines and/or water may be used.

The polyisocyanate compositions and the isocyanate-reactive hydrogen containing compound may be reacted under conventional foam-forming conditions. In general, this involves preparing a reaction mixture containing a blowing agent in addition to the polyisocyanate and active hydrogen compound.

Such reaction mixtures may also contain other conventional ingredients, for example catalysts, surfactants, flame retardants, degellants and trimerisation catalysts.

The compositions according to the present invention which are used for woodbinding and coating applications (hence those comprising at most 98% of polyisocyanate) exhibit an improved combination of yield-value- and viscosity properties. Surprisingly, the yield-value of compositions is considerably higher than that of the corresponding polyisocyanate as such while the increase of the viscosity (expressed as the Casson viscosity as defined in "Paint Flow and Pigment Dispersion" by T. C. Patton, edited by Wiley Interscience, 2nd edition, 1979, ISBN 0-471-03272-7, page 357), remains limited. The yield value is a known parameter which can be measured by a rheometer, like a Cone and Plate Rheometer.

Such compositions preferably have a yield value of at least 20 N/m$^2$ and a Casson viscosity which is not more than three times the viscosity of the pure polyisocyanate used in the composition.

The following Examples illustrate the present invention.

EXAMPLE 1

277.5 g of polymeric MDI (Suprasec DNR from Imperial Chemical Industries PLC), 15 g of dried Bentone 27 (organo clay from National Lead Chemicals, trade mark), 7,5 g of propylene carbonate and 200 g of thrichloro fluoromethane were combined and mixed under high shear in a Silversun L2R high speed mixer for 20 minutes at room temperature. Subsequently the mixing under high shear was continued for 100 minutes while allowing trichlorofluoromethane to evaporate. In order to remove more trichlorofluoromethane the mixture was put under vacuum and heated to 90° C. until the formation of bubbles due to the evaporation of trichlorofluoromethane stopped.

The composition obtained was tested as to the yield value and the Casson viscosity (both on a Carrimed Rheometer). The yield value was 31 N/m$^2$ and the Casson viscosity 353 cP.

EXAMPLE 2

This example was conducted as example 1 except that first MDI, propylene carbonate and trichlorofluoromethane were combined and mixed for 1 minute. Subsequently the organo clay was added followed by 20 minutes mixing under high shear and 100 minutes mixing under high shear while allowing trichlorofluoromethane to evaporate. Yield value: 22.4 N/m$^2$. Casson viscosity: 540 cP.

EXAMPLE 3

This example was conducted as example 1 except that first the organo clay and the propylene carbonate were combined and dry-blended for 10 minutes, that this blend was added to trichlorofluoromethane followed by high shear mixing for 10 minutes, and that MDI was added to this mixture followed by mixing under high shear while allowing trichlorofluoromethane to evaporate. Yield value: 68 N/m². Casson viscosity: 280 cP.

EXAMPLE 4

This example was conducted as example 3 except that the blend was added to MDI followed by mixing under high shear for 20 minutes and addition of trichlorofluoromethane to this mixture. Yield value: 44 N/m² Casson viscosity: 470 cP.

EXAMPLE 5

This example was conducted as example 3 except that the amount of trichlorofluoromethane was 400 g and of propylene carbonate was 3.75 g. Yield value: 161 N/m². Casson viscosity: 304 cP.

EXAMPLE 6

15 g of dried Bentone 27 and 7.5 g of propylene carbonate were combined and dry-blended for 10 minutes. Subsequently 277.5 g of MDI (the same one as used in example 1) was added, followed by mixing under high shear at room temperature for 20 minutes. Yield value: 29 N/m². Casson viscosity: 284 cP.

EXAMPLE 7

15 g of dried Bentone 27 and 200 g of trichlorofluoromethane were combined and mixed under high shear at room temperature for 10 minutes. Subsequently 277.5 g of MDI (the same one as used in Example 6) was added to the mixture followed by mixing under high shear at room temperature for 100 minutes while allowing trichlorofluoromethane to evaporate. Yield value: 2.6 N/m². Casson viscosity: 574 cP.

EXAMPLE 8

The yield value and Casson viscosity of the MDI used in the previous examples was determined. Yield value: 0.14 N/m². Casson viscosity: 217 cP.

EXAMPLE 9

In order to assess the amount of absorption by wood the following test was conducted. Droplets of different polyisocyanate composition were placed on cellulose TLC plates (Merck cellulose F, type 5574) as a model of a wood surface. The increase of the diameter (mm) of the droplet after 15 and 60 minutes was measured. The polyisocyanates used and the results obtained were as follows:

| Polyisocyanate composition | 1 | 2 | 3 | 4 |
|---|---|---|---|---|
| Suprasec DNR | 100 | 97.5 | 95.0 | 92.5 |
| Propylene carbonate | — | 2.5 | — | 2.5 |
| Bentone 27 | — | — | 5.0 | 5.0 |
| Diameter increase | | | | |
| after 15 min | 11.6 | 12.8 | 6.3 | 3.5 |
| 60 min | 18.0 | 18.0 | 12.9 | 7.5 |

The amounts are in parts by weight and composition 4 was made as in Example 3.

EXAMPLE 10

The following combination were made

| Combination | 1 | 2 | 3 | 4 | 5 |
|---|---|---|---|---|---|
| Suprasec VM 25 | 97.5 | 95 | 92.5 | 92.5 | 95 |
| propylene carbonate | 2.5 | | 2.5 | | |
| dried Bentone 27 | | 5 | 5 | 5 | 5 |
| Acetone | | | | 2.5 | |
| Arcton 11 | | | 92.5 | 92.5 | 95 |
| Comments | High shear mixing, good dispersion | High shear mixing, bad dispersion | gel | gel | |

Amounts are expressed in grams. Combinations 3 and 4 were made by mixing the Bentone and the propylene carbonate or acetone and adding this to Arcton 11 followed by high shear mixing for 5 min. and adding the gel obtained to VM 25 followed by high shear mixing for 5 min. and heating at 100° C. for 5 hours.

The combinations had the following yield values (N/m²) and casson viscosities (cP)

| Combination | 1 | 2 | 3 | 4 | 5 | VM 25 |
|---|---|---|---|---|---|---|
| Yield value | 0.06 | 0.57 | 80.6 | 70.6 | 0.08 | 0.06 |
| Casson viscosity | 170 | 290 | 550 | 720 | 320 | 200 |

After having been diluted with VM 25 to a Bentone 27 content of 0.81% w, foams were made from the combinations by reacting them with a polyol composition comprising Daltocel F 2805 (100 parts, a polyol from Imperial Chemical Industries, trade name), water (3.0 parts), Arcton 11 (10 parts, Arcton is a trade name of Imperial Chemical Industries), Tegostab B 4113 (1.0 part, a surfactant from Goldschmidt, trade name), Niax A1 (0.1 parts) and DABCO 33 LV (1.0 part, catalyst from Arco, trade name).

The amounts (parts by weight) used and the recession (%) were as follows (recession is defined as $$\frac{(H_{max}/w) - (H_5/w)}{H_{max}/w} \times 100$$

wherein $H_{max}$ is the maximum height of the foam, $H_5$ is the height of the foam 5 minutes after the reaction started and w is the weight of the ingredients used):

| Combination | 1 | 2 | 3 | 4 | 5 |
|---|---|---|---|---|---|
| Amount of diluted combination | 167.3 | 167.3 | 167.3 | 167.3 | 167.3 |
| Amount of polyol composition | 281.5 | 280.4 | 279.3 | 279.3 | 280.4 |
| Recession | 1.1 | 1.1 | 1.7 | 1.1 | 1.1 |

The index of the foams was 100.

EXAMPLE 11

5.56 parts by weight Bentone 27 and 2.78 parts by weight (pbw) propylene carbonate were mixed and added to 50 pbw Arcton 11 followed by high shear mixing for 5 min. The gel obtained was added to 50 pbw Suprasec VM 90 HF followed by high shear mixing for 5 minutes and heating at 100° C. for 5 hours. After having been diluted with VM 90 HF to 4.0% w of Bentone 27, rigid foams were made by reaction with a polyol composition and the densities were measured. The index was 110 in both cases.

|  | Foam 1 | Foam 2 |
|---|---|---|
| Polyol composition | | |
| Polyol | 35.3 | 35.3 |
| Sr 242 | 0.36 | 0.36 |
| water | 0.18 | 0.18 |
| SCF | 1.1 | 1.1 |
| Arcton 11 | 11.71 | 11.71 |
| Isocyanate | | |
| VM 90 HF | 51.35 | 51.35 |
| Bentone 27 | — | 2.21 |
| Propylene carbonate | — | 1.1 |
| Density (Kg/m$^3$) | 31.2 | 29.3 |

All amounts are in parts by weight. SR 242 is a surfactant from Air Products. SFC is a catalyst from Imperial Chemical Industries. The polyol was a mixture of 39.1 pbw of Daltolac P 230 from Imperial Chemical Industries, 9.8 pbw of Voranol RA 800 from DOW Chemicals, 39.1 pbw of a polyol having OH value of 500 and functionality of 3.2 and 12.0 pbw of a flame retardant (TCEP).

EXAMPLE 12

Flexible foams were prepared as described in example 10 with the combinations 3 and 5 (described in example 10) with the proviso that the amount of Bentone and propylene carbonate was doubled. The index of the foams was as in example 10. The recession for the combinations 3 and 5 were 2.7 and 1.0% respectively.

We claim:

1. A method for preparing a polyurethane or polyisocyanurate foam which comprises reacting an isocyanate-reactive compound and an isocyanate composition comprising an isocyanate, an organo-clay and a cyclic alkylene carbonate, in the presence of a foaming agent.

2. Method according to claim 1, characterised is that the cyclic alkylene carbonate is butylene carbonate or propylene carbonate.

3. Method according to claim 2, characterised in that the composition comprises 60–99.98% weight of polyisocyanate, 0.01–20% weight of organo clay and 0.01–20% weight of cyclic alkylene carbonate, calculated from the total amount of polyisocyanate, organo clay and polar activator in the composition.

4. Method according to claim 3, characterised in that the composition further comprises an inert, low-boiling liquid.

5. Method according to claim 4, characterised in that the yield value of the composition is at least 20 N/m$^2$ and that the Casson viscosity is not more than three times the viscosity of the pure polyisocyanate used in the composition.

6. A polyurethane or polyisocyanurate foam obtained by the method of claim 1.

* * * * *